US006845679B2

(12) United States Patent
Shea

(10) Patent No.: US 6,845,679 B2
(45) Date of Patent: Jan. 25, 2005

(54) FIXTURE FOR HOOD SLAM SIMULATION

(75) Inventor: Robert E. Shea, Newaygo, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 0 days.

(21) Appl. No.: 10/607,396

(22) Filed: Jun. 26, 2003

(65) Prior Publication Data

US 2004/0261548 A1 Dec. 30, 2004

(51) Int. Cl.$^7$ ............................................. G01N 19/00
(52) U.S. Cl. ................................ 73/865.9; 73/865.6
(58) Field of Search .............................. 73/865.9, 865.6

(56) References Cited

U.S. PATENT DOCUMENTS

| | | | |
|---|---|---|---|
| 5,902,941 A | | 5/1999 | Gabiniewicz |
| 5,936,167 A | * | 8/1999 | Kulig et al. ................ 73/865.6 |
| 6,014,893 A | * | 1/2000 | Reed et al. .................. 73/49.7 |
| 6,186,013 B1 | | 2/2001 | Gabiniewicz et al. |
| 6,510,753 B1 | | 1/2003 | Blais |

* cited by examiner

Primary Examiner—Edward Lefkowitz
Assistant Examiner—Jermaine Jenkins
(74) Attorney, Agent, or Firm—Price Heneveld Cooper Dewitt & Litton

(57) ABSTRACT

A test fixture includes a weighted frame incorporating air-filled bellow feet for simulating a vehicle suspension and tires. A hood-simulating support is pivoted to the frame and includes a mount for a grille. A shock absorber on the frame rapidly decelerates the support as the support reaches the closed position. An actuator is operably connected to a controller for closing the support at predetermined speeds for simulating stresses and forces on the grille as seen on actual vehicles. The combination simulates hood closure, including vehicle "bounce" upon hood closure. The controller can be programmed to provide different closure speeds and different air pressures in the feet for better simulation of particular vehicle models. In one form, the fixture includes an enclosure for controlling a temperature of an air fluid source and air for operating the actuator.

27 Claims, 8 Drawing Sheets

FIXTURE FOR HOOD SLAM SIMULATION

BACKGROUND

The present invention relates to fixtures for testing closure members on vehicles, such as hood assemblies, and more particularly relates to a fixture adapted to test the durability of a grille attached to a hood assembly, though the present inventive concepts are not limited to only testing grilles and hood assemblies.

Grilles are sometimes mounted along a front edge of hoods on modern vehicles. This can save parts, facilitate vehicle assembly by allowing subassembly separate from the vehicle assembly line, and further provide a more open engine compartment and open area in a front of the vehicle. However, in this position, the grilles experience substantial stress as the hoods are closed, especially when the hoods are slammed shut, such that the grilles may crack and fail over time. At least one vehicle manufacturer has recently begun to specify that the hood-mounted grilles not fail after a certain number of hood-closing cycles. However, hoods and prototype vehicles are not available for testing grilles until late in a vehicle development program, such that it is difficult to make a realistic test. Concurrently, early attempts to simulate the stress induced in hood-mounted grilles upon a hood slam have tended to be "home-made" and non-repeatable. Thus, if a grille supplier company really wanted something resembling a realistic test, they had to wait for an actual prototype hood, which as noted above isn't usually available until late in a vehicle development program. This puts tremendous pressure on the grille manufacturers, because they don't know if their grille is structurally acceptable until late in the development program and potentially "too late" to make significant tooling changes on a non-rush basis.

In addition to the above, it is desirable to provide an adjustable hood slam fixture capable of replicating stresses and cycles on grilles and hood assemblies in different environments (e.g. cold or hot environments) and/or for testing on different vehicle models (e.g. adjustable to simulate their different suspensions, tire styles, pressures, vehicle mass weights, hood hinge and latching devices, and front-of-vehicle frame and body structures).

Accordingly a fixture solving the aforementioned problems and having the aforementioned advantages is desired.

SUMMARY OF THE PRESENT INVENTION

In one aspect of the present invention, a test fixture includes a frame incorporating a suspension device for simulating a vehicle suspension and tires. A support is pivotally attached to the frame for movement about a pivot axis between open and closed positions, the support having a mount spaced from the pivot axis and that is adapted to engage and support a component attached to the mount. A stopping device is provided for rapidly decelerating and stopping the support as the support is moved toward and reaches the closed position. The frame has a mass above the suspension device sufficient to simulate a reaction of a vehicle mass as the support reaches the closed position and closure movement is stopped. An actuator is operably connected to the support for closing the support at a predetermined speed, such that the fixture is adapted to test the component attached to the mount by generating the forces and stresses associated with the closing motion. In a narrower form, the fluid in the feet is air.

In another aspect of the present invention, a test fixture includes a frame having fluid-filled feet for simulating a vehicle suspension and tires. A hood-simulating support is pivoted to the frame for movement about a pivot axis between open and closed positions, the support being adapted to engage and support a grille. A stopping device is provided for rapidly decelerating and stopping the support as the support reaches the closed position, and an actuator is operably connected to the support for closing the support at a predetermined speed. By this arrangement, a grille attached to the mount experiences the force and stresses associated with the closing motion.

In another aspect of the present invention, a test fixture includes a frame, and a hood-simulating support pivoted to the frame for movement about a pivot axis between open and closed positions, the support being adapted to engage and support a grille. A stopping device is provided for rapidly decelerating and stopping the support as the support reaches the closed position. The stopping device includes a shock absorber mounted on the frame for dampening movement of the support as the support is moved to the closed position in a manner similar to actual vehicle conditions. An actuator is operably connected to the support for closing the support at a predetermined speed, such that a grille attached to the mount experiences realistic forces and stresses associated with the actual vehicle conditions.

In still another aspect of the present invention, a test fixture includes a support operably supported for movement along a path between open and closed positions, the support being adapted to engage and support an exterior automotive component. A stopping device is provided for rapidly decelerating and stopping the support as the support reaches the closed position. An actuator is operably connected to the support for motivating the support at a predetermined speed. A sensor is provided that is adapted to sense a speed of the support when moving the support toward the closed position. A controller is operably connected to the actuator and the sensor, the controller being programmed to adjustably control the actuator so that the support moves toward the closed position with a desired speed, such that a component attached to the support experiences the force and stresses associated with a predetermined closure motion.

In still another aspect of the present invention, a test fixture includes a fixture frame, a support movably attached to the fixture frame for movement between an open position and a closed position, and an actuator. The actuator includes fluid (which is air in a preferred embodiment) for motivating the closure member between the open and closed positions and is operably connected to a fluid source. A thermostatically controlled enclosure is provided on the fixture frame for maintaining the fluid and fluid source at a consistent operating temperature, even when the fixture is in a cold environment, so that the temperature does not adversely affect consistency of movement of the actuator.

An object of the present invention is to provide a test fixture adapted to accurately simulate a hood slam for the purpose of testing the structural strength and durability of a grille intended to be attached to and supported by the hood.

Another object is to provide a test fixture having the flexibility and structure to accurately simulate a vehicle body when a major body component is slammed shut, such as a driver door, a trunk lid, a rear hatch, a horizontally-sliding side door, and/or other large panel-shaped members that move between storage and use positions to close openings in or on a vehicle. Further, it is desirable that the test fixture be adjustable to simulate the body of different vehicle models having different weights (mass), different tires and suspensions, and different reactions to slam-type closure.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
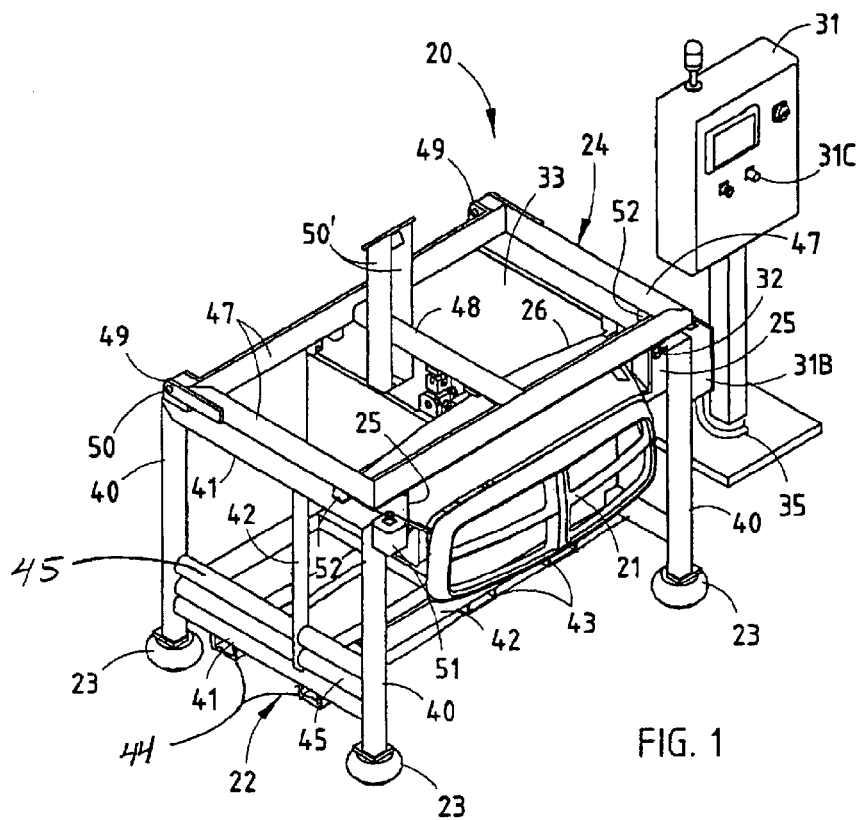
FIGS. 1 and 1A are perspective views of a hood slam fixture, FIG. 1 showing the grille and grille support in a closed position and FIG. 1A showing the same in an open position.

The present fixture 20 (FIG. 1) is adapted to test a hood-supported grille 21, where the grille 21 is attached directly to a vehicle hood at a location under a front edge of the vehicle hood. Nonetheless, it is specifically contemplated that several of the concepts disclosed below can be used in other test fixtures, such as fixtures for testing closure members on vehicles where mass plays an important part in the closing action, such as a driver door, a trunk lid, a rear hatch, a horizontally-sliding side door, and/or other large panel-shaped members that move between storage and use positions to close openings in or around a vehicle. In the present arrangement, the hood-mounted grille 21 experiences a complex combination of torque and stress every time its vehicle hood is closed. The stress on grilles can be significant, particularly when the hood is slammed and/or when it is in a cold environment (i.e. simulating winter). Grilles can weigh from 2 pounds up to 14 pounds, and the speed of closure can be 6 feet per second up to 10 feet per second. For example, testing has shown that, at these speeds and weights, the stress can reach 60 to 80 times gravitational force (i.e. "G" force). For example, at least one vehicle manufacturer is now specifying force testing at 6 feet per second and 10 feet per second as part of grille prototype and quality approval.

Figure 5:
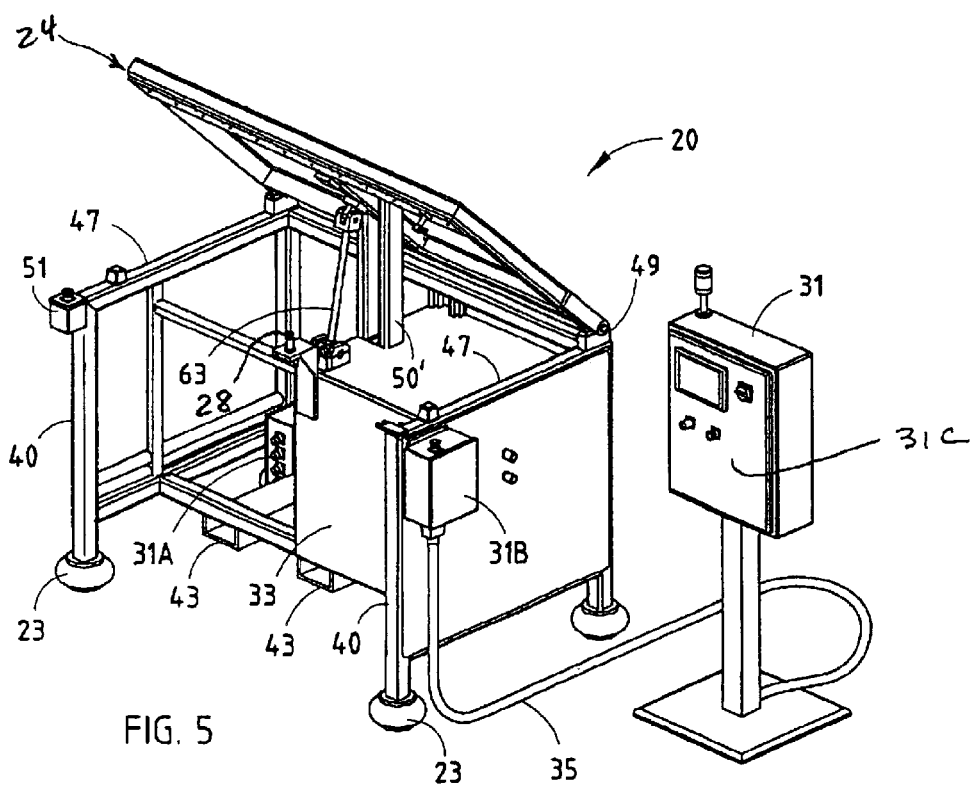
FIG. 5 is a perspective view similar to FIG. 1, but with the grille removed and showing the controller.
Figure 10:
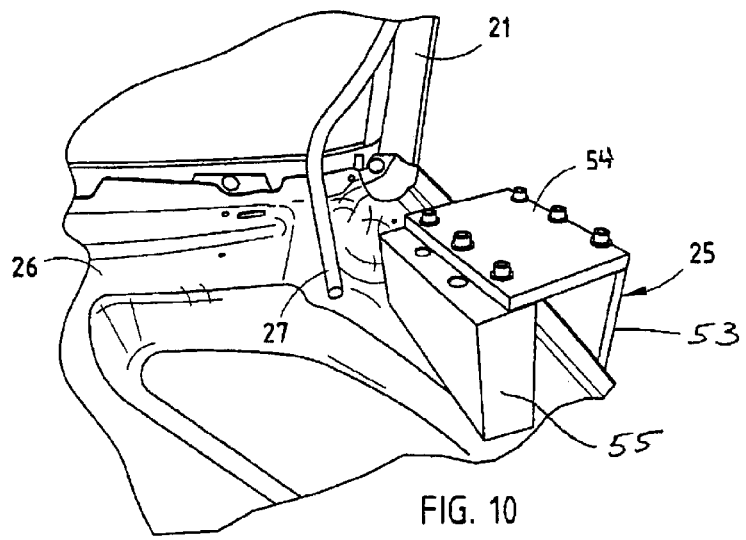
FIGS. 10–11 are fragmentary perspective views of the grille mount shown in FIG. 1.
Figure 11:
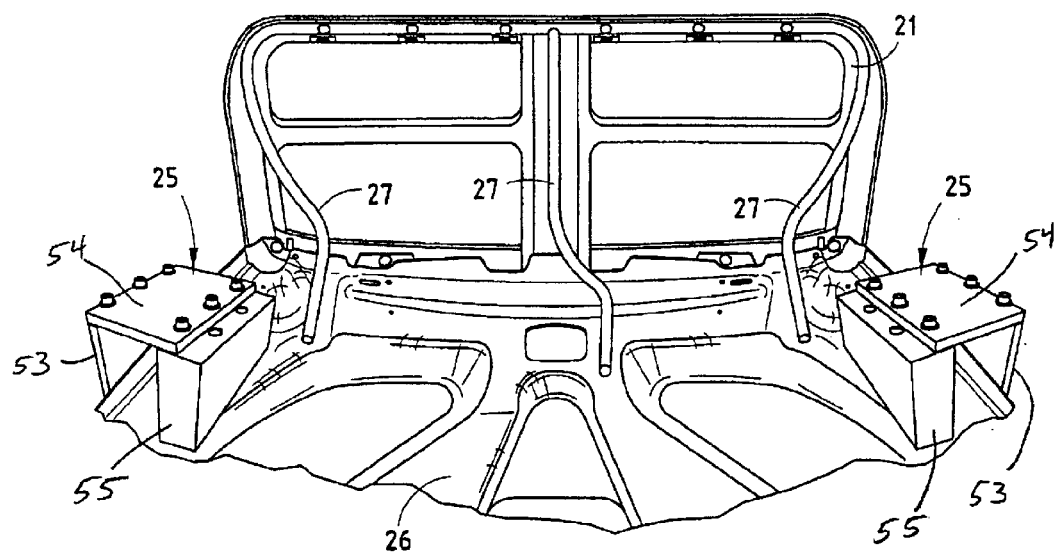

The test fixture 20 includes a weighted frame 22 incorporating air-filled inflated bellow feet 23 for simulating a vehicle suspension and tires. A hood-simulating support 24 is pivoted to the frame 22 and includes mounts 25, with a hood section 26 and brackets 27 (FIGS. 10–11) attached to the mounts 25 for supporting the grille 21. It is contemplated that the hood section 26 and brackets 27 can be eliminated, if desired, if a prototype hood and brackets are not available, however more reliable results are probably achieved by using them, since actual conditions are more accurately represented. A shock absorber 28 (FIG. 5) is attached to a front and center of the frame 22 and is configured to engage and rapidly decelerate the support 24, hood section 26 and grille 21 in a manner simulating actual vehicle conditions as the support 24 reaches the closed position. A pneumatic actuator 30 (FIG. 1A) is operably connected to a programmable controller 31 (FIG. 5) for closing the support 24 at predetermined speeds and for a selected number of cycles, in order to simulate stresses and forces on the grille 21 as seen on actual vehicles.

Figure 6:
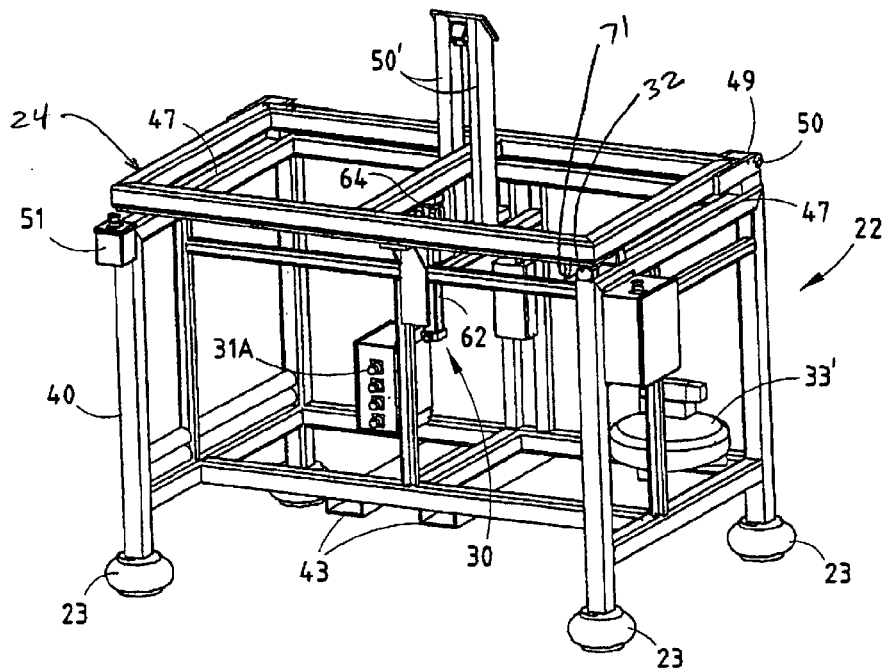
FIG. 6 is a perspective view similar to FIG. 5, but with sidewalls of the temperature-controlled enclosure removed to show the compressed air source.

The components of fixture 20 are intended to accurately and repeatably simulate hood closure, including vehicle "bounce" upon hood closure, which can be an important determinant of the stresses and forces developed. The illustrated controller 31 can be programmed with a database of information on different vehicle models to provide for better simulation of particular vehicle models. This also allows quick changeover of the fixture from one test sequence to the next. In one form, the controller 31 is operably connected to the feet 23 to control air pressure, and operably connected to a speed sensor 32 and to the actuator 30 to control closure speeds. The controller 31 can also be operably connected to a heated enclosure 33 and various other heaters on the fixture 20 to control a temperature of an air fluid source 33' (FIG. 6) and joints. By this arrangement, maximum repeatability is provided, even at temperatures from −40° F. to 150° F., as well as quick changeover to new test conditions. The controller 31 is connected to the components of the test fixture 20 by a disconnectable multi-cable cord 35 (FIG. 1) that allows the controller 31 to remain outside of a cold room while still controlling the test fixture 20. Also, the illustrated controller 31 is programmed to record data concerning function of the text fixture, and incorporates a wireless transmitter for downloading the recorded information to a portable computer. This allows data to be quickly recorded from the test fixture and taken to a separate location for analysis.

Figure 8:
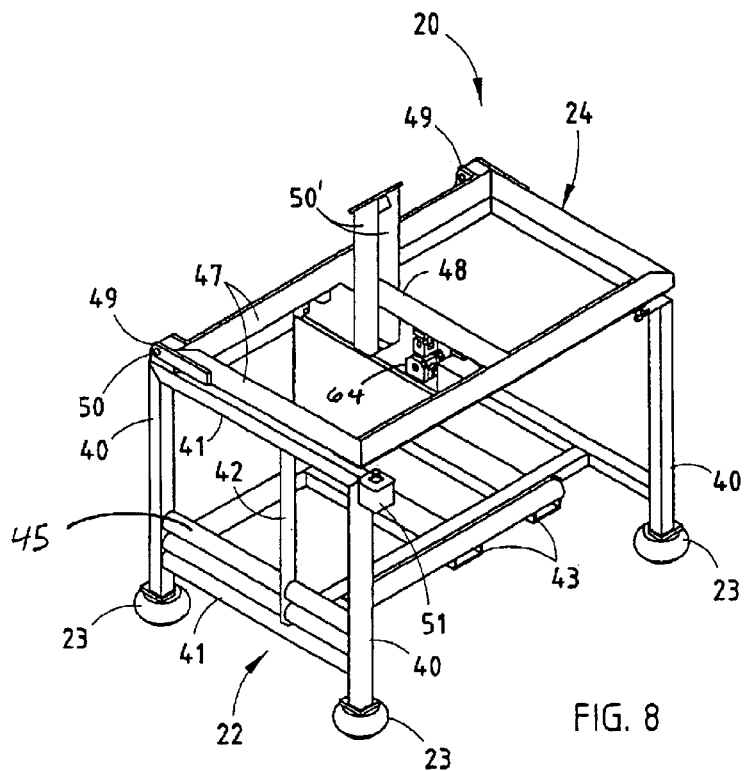
FIG. 8 is a fragmentary perspective view of a lower portion of the frame.

The frame 22 (FIG. 1) includes four vertical tubular legs 40 connected together by a plurality of horizontal tubular cross pieces 41 that extend between the legs 40 and also by a plurality of braces 42 that extend between the cross pieces 41. Channels 43 and 44 (FIG. 1A) are attached to the frame 22 to receive fork truck tines for transporting the fixture 20. Weights 45 (FIG. 8) can be added to the frame 22 to increase its mass and to more optimally distribute the mass of the fixture 20. Testing has shown that a mass of frame 22 need not be equal to the mass of a front end of a real vehicle. Nonetheless, the frame 22 should have sufficient mass, such as a few hundred pounds, to provide a reaction similar to the "bouncing" action of a vehicle front end when a hood is slammed. A front of the frame 22 is kept relatively open, so that the mounts 25 (FIG. 1), hood section 26, and grille 21 can fit down into the open area when the support 24 is closed.

Feet 23 (FIG. 1) are bellow-type or balloon-like air-inflated members attached to bottoms of the legs 40. Such air-inflated "air cushion" members are commercially available, such as from Goodyear Company, and are often placed under machines to reduce vibration and noise transmission from machines into the floor, or to reduce vibration and nose transmission from the floor to a machine. However, Applicant is not aware of anyone using such air cushions on a fixture as in the present invention. The present air cushions can be inflated to a variety of different pressures, and it is noted that they are flexible such that, as they are inflated, they begin to change from a doughnut-like flat disk shape toward a stiffer spherical shape. By increasing or decreasing a pressure within the inflated feet 23, the "bounce" characteristics of different vehicle suspensions, tire pressures and tire styles can be simulated. It is conceived that the controller 31 can be connected to valves on the air supply 33' for automatically increasing or decreasing air pressure in the feet to better simulate a test on a grille for a particular model vehicle. It is noted that air is a fluid and that the feet are referred to as being "fluid-filled" in a broadest sense to cover other gases, fluids, and the like that can be used in place of the illustrated air-filled feet.

Figure 9:
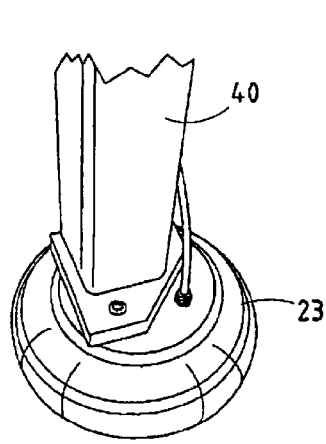
FIG. 9 is an enlarged view of the inflated bellow feet.
Figure 9A:
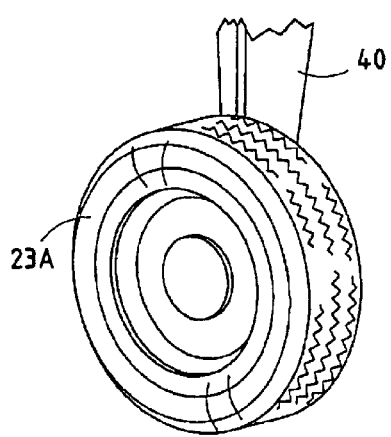
FIG. 9A is a perspective view of an alternative air-inflated support for the fixture.

It is contemplated that other feet 23 can be used and still be within a scope of the present invention. Alternative feet 23A (FIG. 9A) can be used that are basically inflated car tires attached to the legs 40. Still other alternatives include air inflated bicycle tires, garden tractor tires, lawn mower tires, and the like. It is also contemplated that springs and automotive shocks can be incorporated into the feet 23 to simulate the action of a vehicle body when a hood is slammed.

The hood-simulating support 24 (FIG. 1) includes tubular beams 47 and 48 forming a figure "8" shape, with beam 48 being the center beam and extending front to rear. Hinges 49 pivotally connect a rear of the support 24 to the main frame 22. The illustrated hinges 49 each include an axially-positioned heater rod 50 extended into a center of the hinges 49. The heater rods 50 are electrically connected to the controller 31 or to a separate heater control. It has been found that a more reliable and repeatable test result can be obtained if the hinges 49 do not drag and do not vary in resistance to pivoting of the support 24. Notably, the present test fixture 20 may sometimes be used in a cold room operating at temperatures 20 to 40 degrees below zero.

A pair of guide channels 50' (FIG. 1) extend upward from a center of the frame 22, at a location near a rear of the fixture frame 22. The center beam 48 is slidably positioned between the channels 50. Clearance is provided so that the guide channels 50 do not drag on the beam 48. An emergency shut-off, such as item 51 located on the front top left of the frame 22, is positioned on the frame 22 for safety and OSHA reasons. A pair of rubber bumpers 52 are placed on the top right and left sides of the frame 22, near a front of the frame 22. The bumpers 52 simulate the rubber bumpers used in vehicles to support hoods when in closed positions.

Right and left stand-type mounts 25 (FIG. 1A) are attached to right and left sides of support 24 under the front beam 47 of the support 24. The mounts 25 include a first attachment plate 53 (FIG. 10) fastened to the front beam 47, legs 54, and a second attachment plate 55 attached to the hood section 26. A bent-tube set of brackets 27 are attached to the hood section 26 and to a grille 21, securing the grille 21 to the support 24 in a manner simulating the grille's attachment to a vehicle.

Figure 1A:
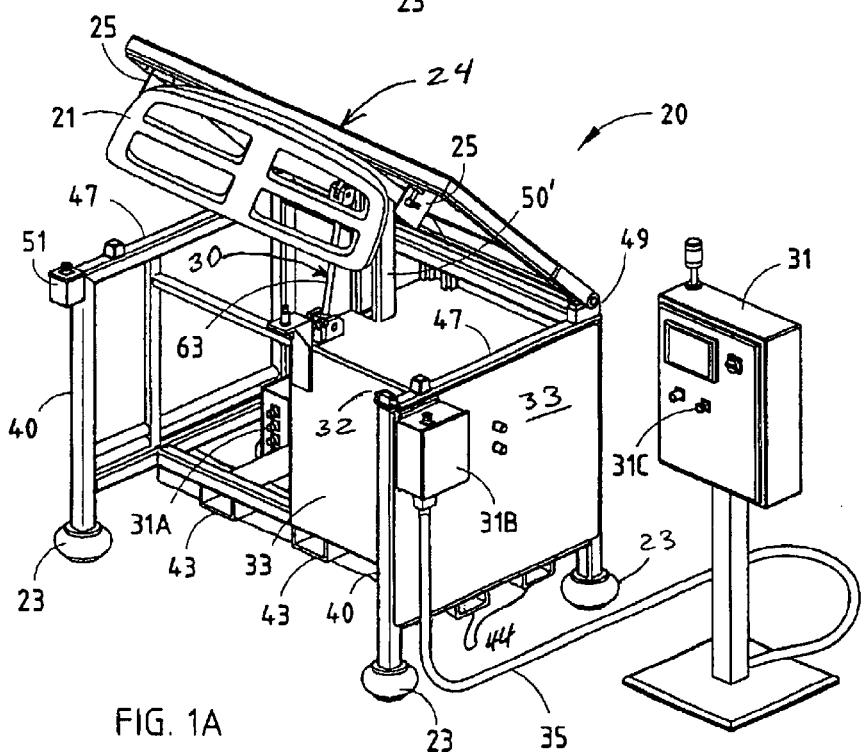
Figure 2:
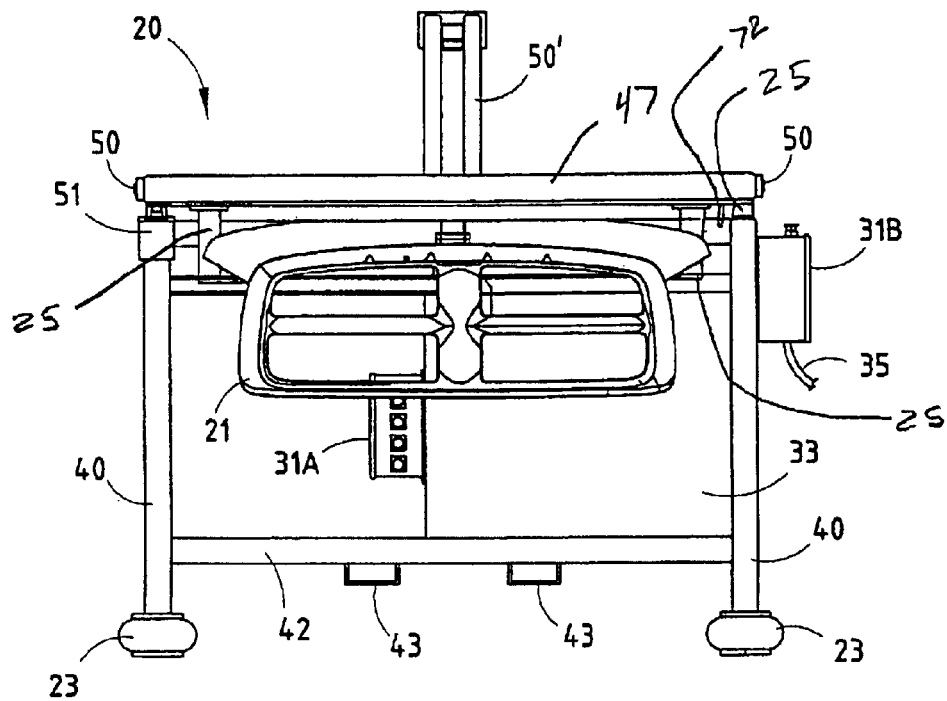
FIGS. 2–4 are front, side, and top views of FIG. 1.
Figure 17:
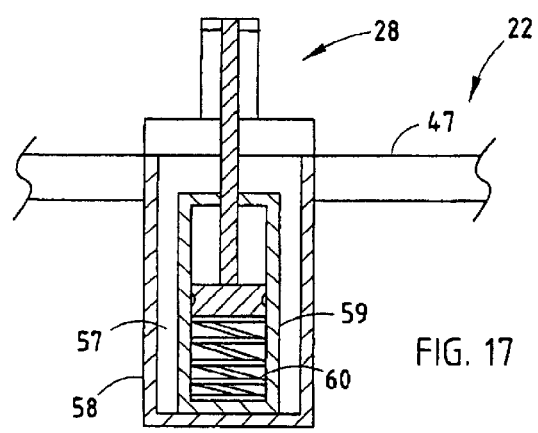
FIG. 17 is a schematic view of the shock absorber for decelerating the grille and grille support upon closure.

When a hood closes, the vehicle manufacturers do not intend it to stop with metal on metal contact, but instead the manufacturers intend that the hood decelerate quickly but in a manner limiting sharp load peaks. The rubber bumpers 52 assist in this deceleration process on fixture 20. However, testing has shown that acting alone, they do not adequately simulate the hood latching and spring-cushion of the hood latch and secondary latch in a center of the hood. Testing has shown that this can be adequately simulated by providing a shock absorber, i.e. the shock absorber 28 (FIG. 5), positioned to engage the support 24 as the support 24 approaches the closed position (FIG. 1) from the open position (FIG. 1A). The shock absorber 28 is important, and its consistent and reliable function is important. Accordingly, a heater sleeve 57 (FIG. 17) is positioned in a housing 58 around the cylinder 59 of the shock absorber 28. This keeps the shock absorber 28 and the internal fluid and dampening mechanism 60 within the shock absorber a stable status for consistent operation at it engages the piston of the shock absorber 28. A temperature adjuster can be positioned immediately at the shock absorber 28 on the housing 58 for adjustment, or alternatively, the temperature can be controlled remotely, such as by controller 31. This allows the shock absorber 28 to consistently function, even where fixture 20 is in a cold room at 40° F., for example.

Figure 3:
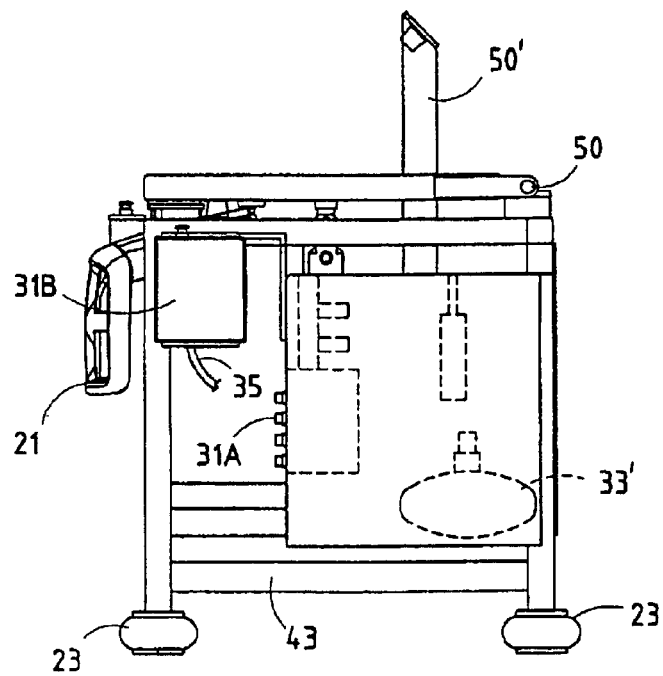
Figure 4:
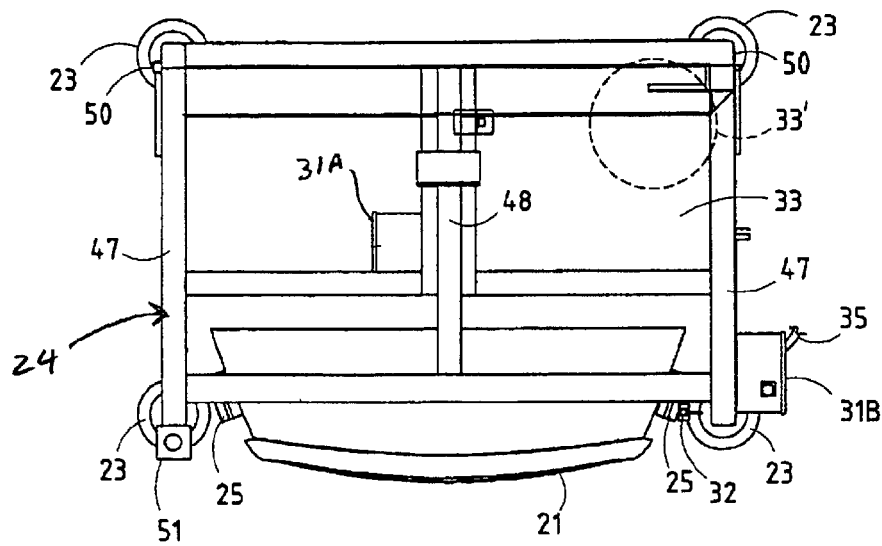
Figure 7:
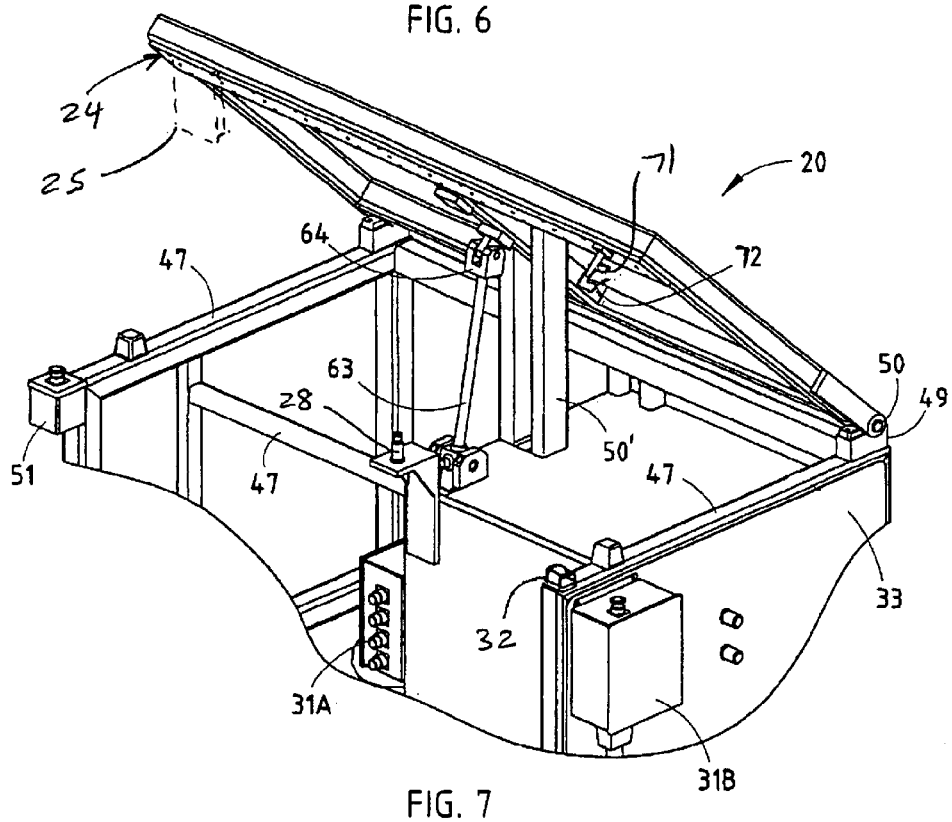
FIG. 7 is a fragmentary view similar to FIG. 5, but with the grille support in an open position.

The actuator 30 (FIG. 6) includes a cylinder 62 pivotally supported by a front/top beam 47 on main frame 22, and further includes an extendable rod 63 (FIG. 7) pivotally connected to the support 24 by a pivot joint or clevis 64 (FIG. 7). The actuator 30 is pneumatic and air driven via compressed air lines that extend to an air supply 33 or surge tank (FIG. 3) positioned within the enclosure 33. Valving 67 on the air supply 33' is connected to the air lines and to the controller 31 for controlling extension and retraction of the actuator 30. The illustrated valving 67 is adapted to control airflow so that the speed of extension and retraction of the rod 63 can be well-controlled. The illustrated actuator is capable of hood closure speeds of 0–15 feet per second.

Figure 12:
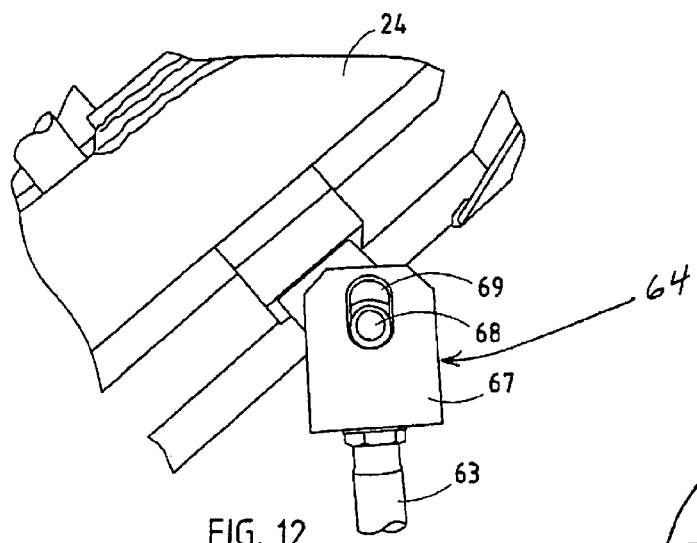
FIG. 12 is a side view of the joint connecting the actuator to the grille support of FIG. 1.
Figure 13:
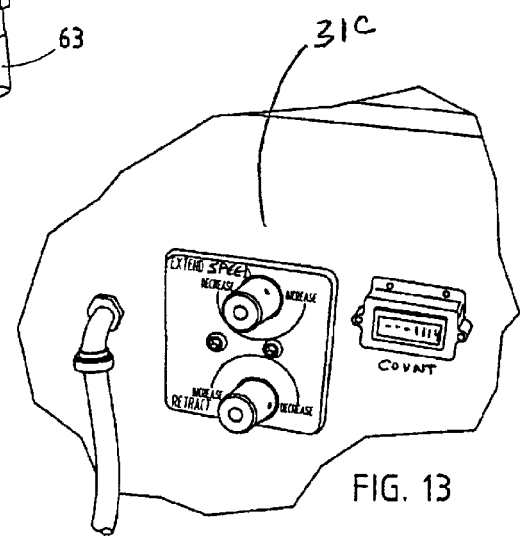
FIG. 13 is a perspective view of the control panel, including adjustable controls and readout display.
Figure 14:
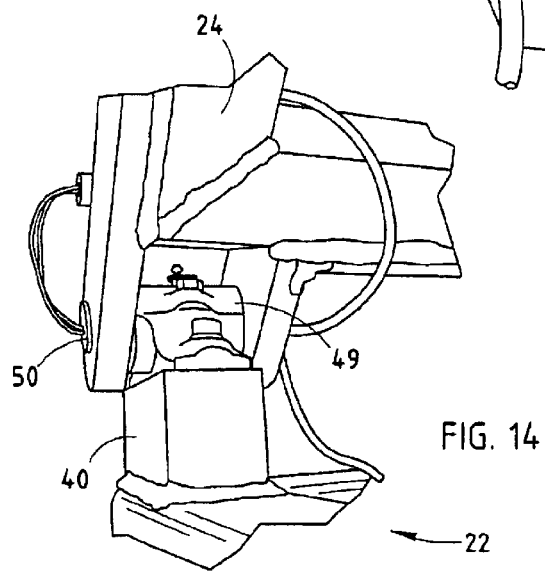
FIG. 14 is a perspective view of the pivot connecting the grille support to the fixture frame.

The rod 63 (FIG. 12) is connected to the support 24 by a clevis arrangement including a bracket 67 and pin 68. The bracket 67 and pin 68 define a slotted joint 69 that permits significant linear mechanical looseness and relative separate travel of the bracket 67 and pin 68 for a short distance. Thus, when the support 24 (including the mounts 25, hood section 26, bracket 27, and grille 21) is rapidly closed, the joint 69 "disconnects" the support 24 from the rod 63 enough so that the forces generated by slamming the support 22 and are not distorted or adversely affected by the action of rod 63 and actuator 30.

Controller 31 is programmable and, depending on the sophistication desired, is operably connected to automatically adjust and control an air pressure in the feet 23, a speed of the actuator 30, and temperatures of the heater rods 50 (FIG. 1) in the support pivots, the heater sleeve 57 (FIG. 17) in the shock absorber 28, and the heat of enclosure 33. Applicant has taken data regarding speed of hood slams on actual vehicles, along with stress data and reaction "bouncing" of the various vehicles in response to hood slams. Applicant has input this into a database for selection and use by the controller 31. By this arrangement, optional test conditions for a particular vehicle can be selected, and the controller 31 will automatically adjust the various components on the fixture 20 to an optimal condition for testing. Also, the present controller 31 is capable of recording and saving data, such that it can print out a graph summary of function of the test fixture 20, or print off a chart of information about the test being run, test conditions and test condition variations, etc. Remote panel controls 31A, 31B, and 31C (FIG. 5) can also be provided to supplement control of fixture 20 apart from controller 31.

Figure 15:
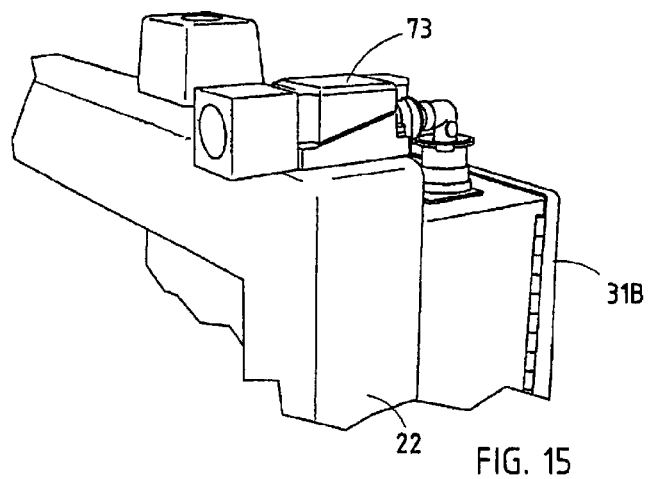
FIGS. 15 and 16 are perspective views of the speed sensor on the fixture frame (FIG. 15) and the targets for speed sensing on the grille support (FIG. 16)
Figure 16:
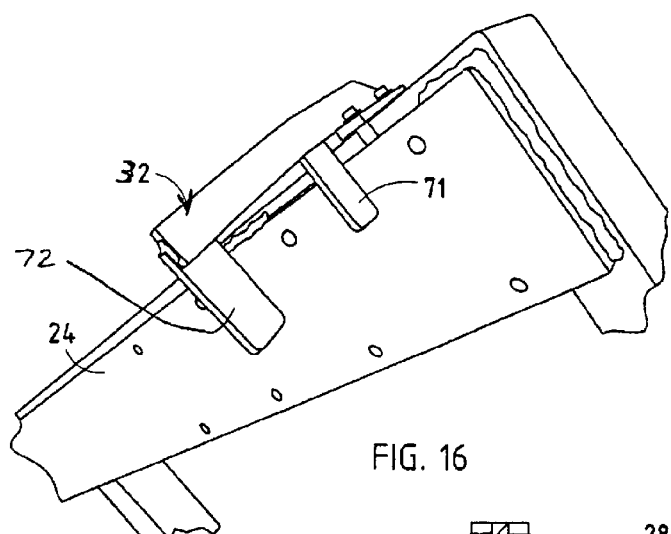

The speed sensor 32 includes a pair of flags or targets 71 and 72 (FIG. 16) attached to the support 24, and a sensor unit 73 (FIG. 15) attached to the main frame 22. As the targets 71 and 72 pass by the sensor unit 73, the amount of time between the targets 71 and 72 is recorded and interpreted as a speed. Notably, various speed-sensing arrangements are possible. It is contemplated that they can be mechanical, electrical, photo-optical, magnetic, or can use other means of sensing and triggering. It is also contemplated that potentiometers could be used at or near the rear pivots of support 24 for speed sensing.

It is to be understood that variations and modifications can be made on the aforementioned structure without departing from the concepts of the present invention, and that such concepts are intended to be covered by the following their language expressly state otherwise.

I claim:

1. A test fixture comprising:
   a frame incorporating a suspension device for simulating a vehicle suspension and tires;
   a support pivotally attached to the frame for movement about a pivot axis between open and closed positions, the support having a mount spaced from the pivot axis and that is adapted to engage and support a component attached to the mount;
   a stopping device for rapidly decelerating and stopping the support as the support is moved toward and reaches the closed position; the frame having a mass above the suspension device sufficient to simulate a reaction of a vehicle mass as the support reaches the closed position and closure movement is stopped; and
   an actuator operably connected to the support for closing the support at a predetermined speed, such that the fixture is adapted to test the component attached to the mount by generating the forces and stresses associated with the closing motion.

2. The test fixture defined in claim 1, wherein the suspension device includes at least one gas-filled foot.

3. The test fixture defined in claim 2, wherein the gas-filled foot is inflated and includes air.

4. The test fixture defined in claim 1, wherein the suspension device includes at least two inflated feet.

5. The test fixture defined in claim 4, including an input for automatically varying the pressure of air within the feet.

6. The test fixture defined in claim 1, including a grille attached to and supported by the support, the grille being the component.

7. The test fixture defined in claim 1, wherein the mount includes at least a portion of a hood.

8. The test fixture defined in claim 1, wherein the frame includes separate weights added to increase a mass of the frame to better simulate a distribution of mass in a vehicle.

9. The test fixture defined in claim 1, wherein the support includes a bottom surface having an attachment site thereon for removably attaching the mount.

10. The test fixture defined in claim 1, wherein the stopping device includes a shock absorber.

11. The test fixture defined in claim 10, including a heater for maintaining a consistent operation of the shock absorber, even when in a cold ambient environment.

12. The test fixture defined in claim 1, including a heated chamber and a fluid source positioned within the heated chamber for operating the actuator.

13. The test fixture defined in claim 1, wherein the actuator includes a clevis joint attaching the actuator to the support.

14. The test fixture defined in claim 13, wherein the clevis joint includes clearance to provide a mechanically loose connection between the actuator and the support.

15. The test fixture defined in claim 1, including a controller and a speed sensor, the controller being operably connected to the actuator and the speed sensor being operably connected to the controller, the controller being programmed to control the actuator for moving the support at a predetermined speed.

16. The test fixture defined in claim 15, wherein the controller is programmed to automatically adjust operation of the actuator to cause a particular closure speed.

17. The test fixture defined in claim 15, wherein the controller includes a database for simulating hood closure on various model vehicles, and further the controller is programmed for selecting a set of data from the database for operating the actuator.

18. A test fixture comprising:
   a frame having fluid-filled feet for simulating a vehicle suspension and tires;
   a hood-simulating support pivoted to the frame for movement about a pivot axis between open and closed positions, the support being adapted to engage and support a grille;
   a stopping device for rapidly decelerating and stopping the support as the support reaches the closed position; and
   an actuator operably connected to the support for closing the support at a predetermined speed, such that the fixture is adapted to test a grille attached to the mount experiences the force and stresses associated with the closing motion.

19. The test fixture defined in claim 18, wherein the fluid-filled feet are inflated with air and are suitable for use as a non-rolling stationary machine cushion.

20. A test fixture comprising:
   a frame;
   a hood-simulating support pivoted to the frame for movement about a pivot axis between open and closed positions, the support being adapted to engage and support a grille;
   a stopping device for rapidly decelerating and stopping the support as the support reaches the closed position, the stopping device including a shock absorber mounted on the frame for dampening movement of the support as the support is moved to the closed position in a manner simulating actual vehicle conditions; and
   an actuator operably connected to the support for closing the support at a predetermined speed, such that the fixture is adapted to test a grille attached to the mount experiences realistic forces and stresses associated with the actual vehicle conditions.

21. The test fixture defined in claim 20, including a heater on the frame for heating the shock absorber to provide a more consistent and controlled dampening action that simulates actual conditions of a vehicle hood being closed even when at a low ambient temperature.

22. The test fixture defined in claim 20, wherein the shock absorber is positioned in a center of the frame and positioned to engage a center of the support when the support is moved to the closed position.

23. A test fixture comprising:
   a support operably supported for movement along a path between open and closed positions, the support being adapted to engage and support an exterior automotive component;

a stopping device for rapidly decelerating and stopping the support as the support reaches the closed position;

an actuator operably connected to the support for motivating the support at a predetermined speed;

a sensor adapted to sense a speed of the support when moving the support toward the closed position; and a controller operably connected to the actuator and the sensor, the controller being programmed to adjustably control the actuator so that the support moves toward the closed position with a desired speed, such that the fixture is adapted to test a component attached to the support experiences the force and stresses associated with a predetermined closure motion.

24. The test fixture defined in claim 23, wherein the controller includes a database and is programmed to operate the actuator to simulate different actual hood-slam forces.

25. The test fixture defined in claim 23, wherein the controller is programmable.

26. The test fixture defined in claim 23, including a data storage device associated with the controller that includes speed data to simulate different vehicles.

27. The test fixture defined in claim 23, including a releasably-connected long multi-wire cable extending between the controller and the sensor, and the actuator.

* * * * *

UNITED STATES PATENT AND TRADEMARK OFFICE
CERTIFICATE OF CORRECTION

PATENT NO. : 6,845,679 B2
DATED : January 25, 2005
INVENTOR(S) : Robert E. Shea

It is certified that error appears in the above-identified patent and that said Letters Patent is hereby corrected as shown below:

Column 6,
Line 13, "at" should be -- as --;
Line 19, "40ºF" should be -- -40ºF --;
Lines 26 and 29, after "valving", delete -- 67 --;

Column 7,
Line 13, before "their" insert -- claims unless these claims by --.

Signed and Sealed this

Eleventh Day of October, 2005

JON W. DUDAS
*Director of the United States Patent and Trademark Office*